Figure 1:
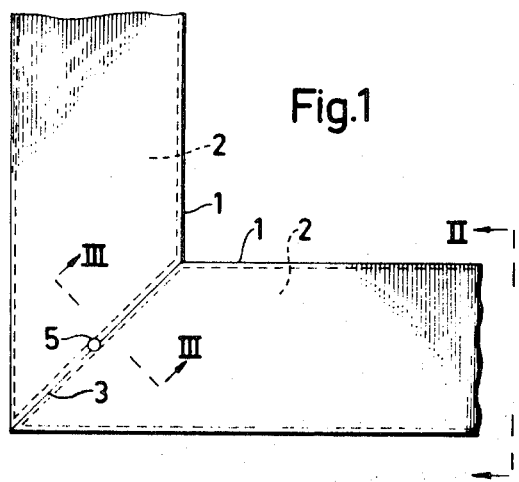

United States Patent
Blomquist

[15] 3,657,037
[45] Apr. 18, 1972

[54] METHOD OF JOINING CORNERS BETWEEN PLASTIC-COVERED WOODEN SECTIONS

[72] Inventor: Bo Sergius B. Blomquist, Enskede, Sweden

[73] Assignee: Hyresgasternas Sparkasse-och Byggnadsforeningars Riksforbud u.p.a., Stockholm, Sweden

[22] Filed: June 27, 1969

[21] Appl. No.: 837,214

[30] Foreign Application Priority Data

Aug. 15, 1968 Sweden....................11,026/68

[52] U.S. Cl.................156/92, 156/293, 156/303.1, 156/304
[51] Int. Cl......................................B29c 11/00
[58] Field of Search..............156/91, 92, 293, 258, 303.1, 156/304, 331, 330

[56] References Cited

UNITED STATES PATENTS

| | | | |
|---|---|---|---|
| 3,481,803 | 12/1969 | Hewitt | 156/92 X |
| 3,475,260 | 10/1969 | Stokes | 156/304 X |
| 2,998,475 | 8/1961 | Grimsinger | 156/258 X |
| 2,278,756 | 4/1942 | Wright | 156/258 X |
| 2,040,126 | 5/1936 | Grieve | 156/293 |
| 2,092,341 | 9/1937 | De Vries | 156/92 X |
| 2,140,672 | 12/1938 | Gray et al. | 156/92 |
| 2,511,168 | 6/1950 | Martin et al. | 156/92 |
| 2,663,662 | 12/1953 | Graf et al. | 156/92 X |
| 2,817,620 | 12/1957 | Golick et al. | 156/293 |
| 3,198,692 | 8/1965 | Bridgeford | 156/331 X |

*Primary Examiner*—Carl D. Quarforth
*Assistant Examiner*—Gary G. Solyst
*Attorney*—Albert M. Parker

[57] ABSTRACT

This invention aims at joining corners between plastic-covered wooden sections and the main object of the invention is to provide tightly welded corner joints of the plastic covering while leaving between adjacent ends of the wooden parts at said corner a gap into which thermosetting resin is injected through at least one hole bored through the welded joint at the outside of the corner so as to glue together the end surfaces of said wooden sections on hardening of the resin.

9 Claims, 4 Drawing Figures

PATENTED APR 18 1972    3,657,037

METHOD OF JOINING CORNERS BETWEEN PLASTIC-COVERED WOODEN SECTIONS

This invention relates to a method of joining corners between plastic-covered wooden sections.

Sections of wood with a tight covering of rigid PVC (polyvinyl chloride) are used, amongst other things, for door-frames, window casements and frames. A fundamental requirement for this technique to be successful is that the PVC covering, including corner joints and necessary bushings, is complete tight. In order to achieve complete tightness of PVC components have been glued or welded together, for example, at the corners. The mechanical strength has sometimes been sufficient with only PVC welding, but sometimes mechanical joints have been necessary, such as screws or steel inserts of various designs. This means that the joint has poor turning and bending rigidity, which is of the greatest importance for the large dimensions of windows which are quite usual nowadays.

In order to avoid these drawbacks there is proposed according to the invention a special method of joining corners between wooden section parts covered with plastic, for example thermoplastic such as polyvinyl chloride. According to the invention the plastic covering of the wooden sections is tightly welded as corner joints while a gap is left between the adjacent ends of the wooden section parts, whereupon the gap is filled by injecting a thermosetting resin suitable for the wooden section parts, for example polyurethane elastomer or epoxy resin with or without the addition of the synthetic rubber substitute sold under the trademark Thiokol, into the gap through one or a plurality of holes in the outside of the corner part. The resulting joint will give extra safety against moisture while still maintaining the required rigidity of the section in the corner joints. The method may be performed by boring a hole at the joint, after the sections have been applied on the wooden section and welded together, whereupon the thermosetting resin is injected between the end surfaces of the wood so that these will be glued together when the resin hardens.

A certain amount of the resin also penetrates between the PVC covering and the wooden material and gives improved control between the PVC coating and the wood. The resin injected may not contain solvent or chemicals which may damage the wood or the PVC. Suitable resin types are epoxy or polyurethane elastomers. As the demands for tensile strength and impact strength are considerable so that the joint can withstand rough treatment during construction and transport, the resin must have a special composition. With the choice of epoxy resins, therefore, Thiokol should be mixed in so as to give great strength and impact strength. On the other hand, it is not usually necessary to treat the surfaces with primer.

If polyurethane elastomer is selected, satisfactory properties can be attained by a suitable choice of starting material and suitable proportions of resin and curing agent. Since the impregnation into the wooden surfaces may be difficult to achieve in a short curing time, it may be necessary to pre-impregnate the wooden surfaces with 4,4 diphenyl methane di-isocyanate. This pre-treatment is then suitably performed before the PVC covering is welded together.

The method described thus provides improved tightness against moisture since the resin also will penetrate into small faults or cracks in the weld and further, the wooden section will obtain a statically unbroken section so that it is extremely rigid at the same time as the impact value and static supporting capacity of the joint is ensured.

In order to avoid visible holes and to improve the impact value of the joint a screw may be screwed in through the injection hole. This should be screwed at an angle to and past the joint surface. The head of the screw then covers the opening of the injection hole and is also threaded in both the sections which are joined together. For this purpose a completely threaded cylindrical screw may be used, for example, possibly of the self-threaded type, as it is not advisable for the two sections to be drawn towards each other when the PVC coating has been welded together. The space between the sections should thus be maintained when the screw is screwed in. The screw may be replaced by a plug.

Figure 2:
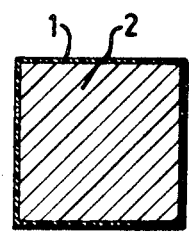
Figure 3:
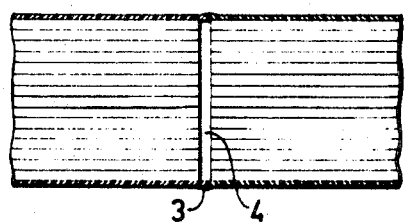
Figure 4:
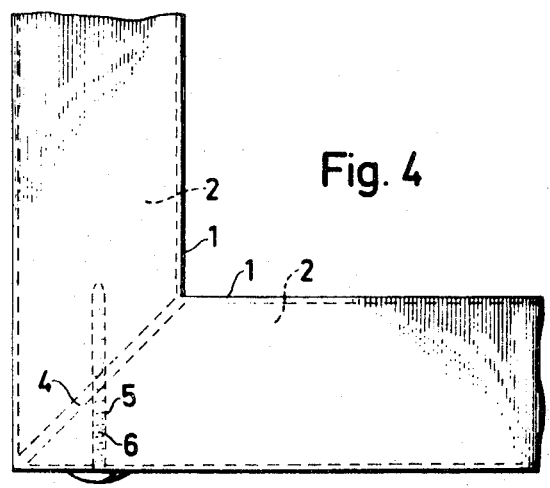

An embodiment of corner made in accordance with the invention is shown in the accompanying drawings, in which:

FIG. 1 is an external view of the corner,
FIG. 2 is a cross-section along the line II—II in FIG. 1,
FIG. 3 is a cross-section along the line III—III in FIG. 1 and
FIG. 4 shows a modified embodiment.

According to the drawings the corner consists of two wooden cores 2, joined together by means of mitering, which are coated or covered with a plastic casing 1 of thermoplastic. The miter joint between the parts of the plastic covering is shown at 3. The plastic covering is welded to complete tightness in such a way that a gap 4 will be formed between the wooden cores 2. A hole 5 is bored through the welded joint and thermosetting resin of the type mentioned above is injected into and fills the gap 4.

According to FIG. 4 the injection hole 5 is bored at an angle to the joint and the gap 4 and when the thermosetting resin has been injected a screw 6 is screwed into this hole 5 through and past the gap 4 so that the head of the screw covers the opening of the hole 5.

I claim:

1. Method of joining plastic covered wooden members to form a corner joint comprising arranging two plastic covered wooden members with exposed wooden surfaces of the members in spaced opposed relationship leaving a gap between said surfaces and with edges of plastic material covering the members aligned, welding together the aligned edges of the plastic covering material to enclose the gap between said wooden surfaces, providing a hole through the plastic covering communicating with said gap, filling the gap by injecting a thermosetting resin into the gap through said hole, and allowing the resin to harden so as to glue the members together.

2. The method of claim 1 wherein the thermosetting resin is selected from the group consisting essentially of polyurethane elastomer and epoxy resin.

3. The method of claim 2 wherein a synthetic rubber substitute is added to the thermosetting resin 4. The method of claim 1 including pre-treating the exposed wooden surfaces with 4,4 diphenyl methane di-isocyanate for improving adhesion of the thermosetting resin to the surfaces.

5. The method of claim 1 wherein the joint is a mitered joint and wherein the stip of arranging comprises placing mitered ends of the members end to end in said spaced opposed relationship.

6. The method of claim 5 wherein said hole is provided by boring through at least one of said plastic covered wooden members.

7. The method of claim 6 including screwing a headed, threaded member into the hole to close the hole after injecting the thermosetting resin.

8. The method of claim 6 wherein said hole is provided by boring through one of said wooden members, across said gap and into the other wooden member, and including screwing a threaded fastener into the hole after injecting the thermosetting resin to join the two wooden members more securely.

9. The method of claim 1 including fitting a plug into said hole after injecting said thermosetting resin to close the hole.

* * * * *